United States Patent [19]

Kawachi et al.

[11] Patent Number: 4,981,948

[45] Date of Patent: Jan. 1, 1991

[54] ZINC-CONTAINING SOLID CATALYST, PROCESS OF PREPARING SAME AND PROCESS FOR PREPARING POLYALKYLENE CARBONATE

[75] Inventors: Hideshi Kawachi; Shuji Minami, both of Yamaguchi, Japan; John N. Armor, Allentown, Pa.; Andrzej Rokicki, Allentown, Pa.; Beatrice K. Stein, Allentown, Pa.

[73] Assignee: Mitsui Petrochemical Industries, Ltd., Tokyo, Japan

[21] Appl. No.: 389,300

[22] Filed: Aug. 3, 1989

[30] Foreign Application Priority Data

Aug. 9, 1988 [JP] Japan ............................... 63-199282
Aug. 9, 1988 [JP] Japan ............................... 63-199283

[51] Int. Cl.$^5$ ............................................. C08G 64/34
[52] U.S. Cl. ................................. 528/405; 502/151; 502/170
[58] Field of Search ........................................ 528/405

[56] References Cited

U.S. PATENT DOCUMENTS

| | | | |
|---|---|---|---|
| 3,699,079 | 10/1972 | Haynes . | |
| 3,706,713 | 1/1972 | Hull et al. | 528/405 X |
| 3,953,383 | 4/1976 | Inoue et al. | 528/405 X |
| 4,686,276 | 8/1987 | Myers | 528/405 X |
| 4,783,445 | 11/1988 | Sun | 528/405 X |
| 4,789,727 | 12/1988 | Sun . | |

OTHER PUBLICATIONS

Die Makromolekulare Chemie-Rapid Communications, vol. 1, No. 12, Dec. 1980, pp. 775-777, Heidelberg, DE; S. Inoue: "Novel Zinc Carboxylates as Catalysts for the Copolymerization of Carbon Dioxide with Epoxides".

Polymer Journal, vol. 13, No. 4, 1981, pp. 407-410, K. Soga et al: "Alternating Copolymerization of $CO_2$ and Propylene Oxide with the Catalysts Prepared from $Zn(OH)_2$ and Various Dicarboxylic Acids".

Primary Examiner—Earl Nielsen
Attorney, Agent, or Firm—Birch, Stewart, Kolasch & Birch

[57] ABSTRACT

According to the present invention, a zinc-containing solid catalyst prepared by contacting zinc oxide with an organic dicarboxylic acid in the presence of or in the absence of an organic solvent under a mechanical pulverization treatment is provided. The catalyst is in a good pulverized state and exhibits a high catalytic activity for polymerization of carbon dioxide with an epoxide to obtain a polyalkylene carbonate.

6 Claims, No Drawings and 1,10-dec# ZINC-CONTAINING SOLID CATALYST, PROCESS OF PREPARING SAME AND PROCESS FOR PREPARING POLYALKYLENE CARBONATE

FIELD OF THE INVENTION

This invention relates to a zinc-containing solid catalyst, a process for the preparation thereof and the use of the catalyst and more particularly to a zinc-containing solid catalyst suitable for the production of polyalkylene carbonates, a process for the preparation thereof and a process for preparing a polyalkylene carbonate using the catalyst.

BACKGROUND OF THE INVENTION

A large quantity of carbon dioxide are evolved on the earth by commercial productive activities and respiration of animals. Although carbon dioxide is readily available as a raw material, because of its low reactivity, carbon dioxide has not been effectively utilized as an industrial resource. It is significant to make use of this readily available industrial resource.

Several processes for the production of synthetic resins in which carbon dioxide is used as a raw material have heretofore been proposed. Among others, Journal of Chemical Society of Japan (1982) No. 2, page 295, discloses such a process in which a reaction product of zinc acetate with an aliphatic dicarboxylic acid or a reaction product of an alkyl zinc with water is used as a catalyst. Further, a process disclosed by Polymer Journal, Vol. 13 (1981) page 407, use is made of as a catalyst reaction products of zinc hydroxide with various organic carboxylic acids.

OBJECT OF THE INVENTION

An object of the invention is to provide a zinc-containing solid catalyst having a prominent catalytic activity which permits the production of synthetic resins using carbon dioxide as a raw material. Another object of the invention is to provide a process for the preparation of the zinc-containing solid catalyst having a prominent catalytic activity. Other object of the invention is to provide a process for preparing a polyalkylene carbonate having a high transparency using a zinc-containing solid catalyst with good yield.

SUMMARY OF THE INVENTION

A first zinc-containing solid catalyst of the present invention is prepared by contacting zinc oxide with an organic dicarboxylic acid under a mechanical pulverization treatment.

A second zinc-containing solid catalyst of the invention is prepared by contacting zinc oxide with an organic dicarboxylic acid in the presence of an organic solvent under a mechanical pulverization treatment.

A first process for preparing a zinc-containing solid catalyst of the invention is characterized by contacting zinc oxide with an organic dicarboxylic acid under a mechanical pulverization treatment.

A second process for preparing a zinc-containing solid catalyst of the invention is characterized by contacting zinc oxide with an organic dicarboxylic acid in the presence of an organic solvent under a mechanical pulverization treatment.

A first process for preparing a polyalkylene carbonate according to the invention comprises copolymerizing carbon dioxide with an epoxide by using a zinc-containing solid catalyst prepared by contacting zinc oxide with an organic dicarboxylic acid under a mechanical pulverization treatment.

A second process for preparing a polyalkylene carbonate according to the invention comprises copolymerizing carbon dioxide with an epoxide using a zinc-containing solid catalyst prepared by contacting zinc oxide with an organic dicarboxylic acid in the presence of an organic solvent under a mechanical pulverization treatment.

The catalyst of the invention is in a good pulverized state and exhibits a high polymerization catalytic activity.

DETAILED DESCRIPTION OF THE INVENTION

The invention is further described below with respect to the zinc-containing solid catalyst, the process for the preparation thereof and a process for preparing a polyalkylene carbonate.

The first zinc-containing solid catalyst of the invention is prepared by contacting zinc oxide with an organic dicarboxylic acid under a mechanical pulverization treatment.

The second zinc-containing solid catalyst of the invention is prepared by contacting zinc oxide with an organic dicarboxylic acid in the presence of an organic solvent under a mechanical pulverization treatment.

Zinc Oxide

Zinc oxide which can be used herein for the preparation of the catalyst is not restricted by its preparation processes. It may be prepared by a variety of known processes including, for example, a process wherein zinc oxalate is pyrolyzed at a temperature of at least 400° C., a process wherein hydroxyzinc carbonate is dehydrated under heat, a process wherein metallic zinc is burnt or a process wherein zinc ores are roasted together with a reducing agent and the generated zinc steam is oxidized by air.

Organic Dicarboxylic Acids

The organic dicarboxylic acids which can be used herein for the preparation of the catalyst include, for example, aliphatic dicarboxylic acids such as oxalic acid, malonic acid, succinic acid, glutaric acid, adipic acid, 1,5-pentane dicarboxylic acid, 1,6-hexane dicarboxylic acid, 1,8-octane dicarboxylic acid and 1,10-decane dicarboxylic acid; and aromatic dicarboxylic acids such as phthalic acid, isophthalic acid, terephthalic acid, 1,2-naphthalene dicarboxylic acid, 1,3-naphthalene dicarboxylic acid, 1,4-naphthalene dicarboxylic acid, 1,5-naphthalene dicarboxylic acid, 1,6-naphthalene dicarboxylic acid, 1,7-naphthalene dicarboxylic acid, 1,8-naphthalene dicarboxylic acid, 2,3-naphthalene dicarboxylic acid, 2,5-naphthalene dicarboxylic acid, 2,6-naphthalene dicarboxylic acid and 2,7-naphthalene dicarboxylic acid.

Of these acids, glutaric acid and adipic acid are particularly preferred. These organic dicarboxylic acids may be used alone or in combination.

Organic Solvents

The organic solvents which can be used herein for the preparation of the second catalyst are not restricted and can include a variety of known solvents. Presumably, such organic solvents will act as a pulverizing assistant.

Such organic solvents include, for example, aliphatic hydrocarbons or their halogenated derivatives, e.g. pentane, hexane, heptane, octane, decane and kerosine; aromatic hydrocarbons or their halogenated derivatives, e.g. benzene, toluene and xylene; phenols or their ether or ester derivatives, e.g. phenol, cresol and xylenol; ethers or their alkyl or aryl derivatives, e.g. diethyl ether, dibutyl ether, methyl butyl ether, ethyleneglycol dimethyl ether, diethyleneglycol dimethyl ether, ethylene oxide, propylene oxide, isobutylene oxide, stylene oxide, cyclohexene oxide, tetrahydropyran, tetrahydrofuran, oxetane, oxirane, dioxane and trioxan; alcohols or their derivatives, e.g. methanol, ethanol, propanol, ispropanol, butanol, isobutanol, hexanol, ethylene glycol, diethylene glycol and glycerine; aliphatic carboxylic acids or their derivatives, e.g. acetic acid, propionic acid, butyric acid, oxalic acid, malonic acid, succinic acid, glutaric acid and adipic acid or the ester derivatives of said acids, e.g. methyl acetate, ethyl acetate, butyl acetate, methyl propionate, ethyl propionate, methyl butylate and ethyl butylate; aromatic carboxylic acids or their esters, e.g. benzoic acid, phthalic acid, naphthoic acid and naphthalene dicarboxylic acids or their ester derivatives; nitriles or their derivatives, e.g. acetonitrile, propionitrile and butyronitrile; amines or their derivatives, e.g. ethylenediamine, butylamine and aniline; and amides or their derivatives e.g. N,N-dimethylformamide (DMF) and hexamethylphosphorus triamide (HMPA).

When zinc oxide is contacted with the organic dicarboxylic acids in the presence of the organic solvents under a mechanical pulverization treatment, the resulting zinc-containing solid catalysts are in a good pulverized condition such as maintaining finely divided and uniform particle size without occurrence of aggregation and coagulation and also they exhibit a very high polymerization catalytic activity.

Of those organic solvents, there are preferably used benzene, toluene, xylene, dioxane, tetrahydrofuran, ethyleneglycol dimethyl ether, diethyleneglycol dimethyl ether, oxetane, epoxide, methanol, ethanol, propanol, isobutanol, ethyl acetate, butyl acetate, methyl propionate, acetronitrile, propionitrile and dimethylformamide.

Such organic solvents are preferable, since they are ordinarily liquid at the temperature at which zinc oxides and organic dicarboxylic acids undergo mechanical pulverization, resulting in penetration into the particles of the zinc-containing solid catalyst to prevent effectively aggregation and coagulation, thus maintaining a finely divided state of the catalyst in good condition.

Further, such organic solvents are effective for acceleration of a reaction for the formation of the catalyst and also for more prevention of the catalyst particles from aggregation and coagulation, since water by-produced by the reaction of zinc oxide with the organic dicarboxylic acids under a mechanical pulverization treatment will become incorporated into the organic solvents.

The organic solvents may be used alone or in combination.

Alternatively, water may be employed as a pulverizing assistant in place of the organic solvents, with not so much result as will be shown in Comparative Example 3.

Preparation of the Catalyst

The zinc-containing solid catalysts of the invention are prepared by bringing zinc oxide into intimate contact with the organic dicarboxylic acids under a mechanical pulverization treatment and reacting them.

The mechanical pulverization treatment is performed using a mill such as a ball mill, vibration mill or shock mill.

The organic dicarboxylic acids are used in the amount of usually 0.1 to 10 moles, preferably 0.5 to 2 moles per mole of zinc oxide. In a case where the organic solvents are used, the amount of the organic solvents added is 1 to 5000 parts by weight, preferably 5 to 1000 parts by weight per 100 parts of the total weight of zinc oxide and the organic dicarboxylic acids.

Particular milling conditions may be chosen depending upon the kind and quantity of the materials to be milled and the particular mill used. For example, in a case wherein from 20 to 40 grams of the materials in sum are milled in a rotating ball mill whose stainless steel cylinder has an inner volume of 800 ml and an inner diameter of 100 mm and contains 100 stainless steel balls of a diameter of 15 mm, milling the materials over a period of from 10 minutes to 30 days, preferably from 20 minutes to 7 days, with a rate of 125 rpm will by suitable. In a case wherein from 20 to 40 grams of the materials in sum are milled in a vibration mill whose stainless steel cylinder has an inner volume of 800 ml and an inner diameter of 100 mm and contains 2.8 kg of stainless steel balls of a diameter of 15 mm, milling the materials over a period of from 1 minute to 10 days, preferably from 5 minutes to 4 days, with a shock acceleration of 7G will be suitable. While the milling may be carried out under ambient conditions, if excess heat is generated it is preferred to control the temperature within the range between 0° and 150° C.

In the present invention, the zinc-containing solid catalysts as synthesized may be used, as it is, for the polymerization of carbon dioxide and an epoxide to produce a polyalkylene carbonate. It is usually preferable to dearate and dry the zinc-containing solid catalyst prior to the polymerization, since water by-produced during the reaction of zinc oxide with the organic dicarboxylic acid as well as alcohols and amines of the organic solvents used in the preparation of the zinc-containing solid catalyst will act as a polymerization inhibitor.

In the zinc-containing solid catalyst so prepared, it is believed that the organic dicarboxylic acid has reacted with zinc oxides. This is because when compared with an infrared spectrum of the starting organic dicarboxylic acid and that of the catalyst reveals that an assymmetric/symmetric vibration absorption band of the carbonyl group has been shifted to a side of lower wave number, and also because a thermal decomposition temperature of the catalyst differs from that of the organic dicarboxylic acid.

Production of Polyalkylene Carbonate

According to the invention, polyalkylene carbonates are produced by reacting carbon dioxide with epoxides in the presence of the zinc-containing solid catalysts as prepared above.

Epoxides

The epoxides which can be used herein include a variety of known epoxides such as monoepoxides, diepoxides or the like, the monoepoxides being preferred. Such monoepoxides include, for example, ethylene oxide, propylene oxide, 1-butene oxide, 2-butene oxide, isobutylene oxide, 1-pentene oxide, 2-pentene oxide, 1-hexene oxide, 1-octene oxide, 1-decene oxide, cyclopentene oxide, cyclohexene oxide, stryene oxide, vinylcyclohexene oxide, 3-phenylpropylene oxide, 3,3,3-trifluoropropylene oxide, 3-naphthylpropylene oxide, 3-phenoxypropylene oxide, 3-naphthoxypropylene oxide, butadiene monoxide, 3-vinyloxypropylene oxide, 3-trimethylsilyloxypropylene oxide, methyl glycidylcarbonate, ethyl glycidylcarbonate and cholesteryl glycidylcarbonate.

Of these epoxides, propylene oxide, ethylene oxide and cyclohexene oxide are particularly preferred. These epoxides may be used alone or in combination.

Polymerization

The reaction of carbon dioxide with an epoxide is carried out usually using a solvent. Such solvents include, for example, aliphatic hydrocarbons such as pentane, hexane, octane, decane and cyclohexane; aromatic hydrocarbons such as benzene, toluene and xylenes; and halogenated hydrocarbons such as chloromethane, methylene dichloride, chloroform, carbon tetrachloride, 1,1-dicholoethane, 1,2-dichloroethane, ethyl chloride, trichloroethane, 1-chloropropane, 2-chloropropane, 1-chlorobutane, 2-chlorobutane, 1-chloro-2-methylpropane, chlorobenzene and bromobenzene. These solvents may be used alone or in combination. In some cases the monomer (epoxide) in itself serves as a polymerization medium. Further, the process of the invention may be carried out in a gaseous phase or in a fluidized bed. The order of addition of the monomer (epoxide), carbon dioxide and the catalyst to the polymerization medium is not particularly restricted.

The ratio by volume of the solvent used to the monomer (epoxide) is generally from 0:100 to 99:1, and preferably from 0:100 to 90:10.

The pressure of carbon dioxide in the reaction system is not particularly restricted but is generally from 0 to 200 kg/cm$^2$G, preferably from 3 to 100 kg/cm$^2$G, and more preferably from 5 to 50 kg/cm$^2$G. The polymerization temperature is generally from 0° to 200° C., preferably from 50° to 150° C.

In this reaction, longer polymerization time can provide more increased yield of the polyalkylene carbonate polymer. Thus, the polymerization time is not particularly restricted, but is usually from 30 minutes to 240 hours, preferably from 1 to 80 hours, and more preferably from 1 to 10 hours.

The polymerization can be performed in a batchwise, semi-continous or continuous operation. Further, the polymerization may be carried out in two or more steps using different reaction conditions.

After completion of the polymerization, catalyst residues may be removed by filtration or by washing with a diluted aqueous acid or alkali. The polymer can be recovered by flush drying or evaporation to dryness of the reaction product to remove the polymerization solvent or by charging a solution of the reaction product in a good solvent into a poor solvent such as hexane or methanol to precipitate the polymer dissolved therein.

The zinc-containing solid catalysts of the invention prepared by a mechanical pulverization treatment especially in the presence of organic solvents are in such good pulverized condition that the catalyst particles are finely divided and have a uniform particle size. Furthermore, they exhibit a very highly polymerization catalytic activity. By use of such catalysts, polyalkylene carbonates can be produced in good efficiency starting from carbon dioxide which has not been utilized for a commercial production of polymers. The polymers produced by the process of the invention have a good transparency and can be completely decomposed by heating. For these properties, they finds applications as materials for the production of optical fibers, optical discs, ceramic binders, and lost form castings in addition to as general purpose shaped structures including films and fibers. Further since the polymers produced by the process of the invention are decomposable in a living body, they will also find applications as medical materials which are required to be biodegradatable. Moreover, we have found that vibration dampers made of the polymers produced by the process of the invention exhibit excellent performances.

The invention is further illustrated by the following non-limitative examples.

EXAMPLE 1

Preparation of Catalyst

A cylinder of a stainless steel ball mill having an inner volume of 800 ml and an inner diameter of 100 mm and containing 100 stainless steel balls of a diameter of 15 mm, was charged with 10.0 grams of commercially available zinc oxide and 16.2 grams of glutaric acid and rotated at a rate of 25 rpm for about one hour. The solid product so treated was dried at a temperature of 150° C. under a reduced pressure and dispersed in hexane to provide a slurry of the catalyst in hexane.

Polymerization

A 2 liter-autoclave was charged with 200 ml of propylene oxide and the slurry of catalyst in hexane consisting of 700 ml of hexane and 5.4 grams of the catalyst. Carbon dioxide was fed to the autoclave, and the reaction system was heated to a temperature of 80° C. and a pressure of 20 kg/cm$^2$ G. While supplying amounts of carbon dioxide to the reaction system sufficient to maintain the pressure, the polymerization was carried out for a period of 2 hours.

At the end of the period the autoclave was cooled and depressurized. From the hexane slurry of a polymer, which was white due to the presence of the catalyst, the polymer was recovered by filtration. After drying 45.4 g of the polymer was obtained. The yield of the polymer was 8.4 g per gram of the catalyst.

EXAMPLES 2 TO 4

Catalysts were prepared as described in Example 1 except that the zinc oxide was brought in contact with the glutaric acid for various periods of time as indicated in Table 1. Using each of the catalysts so prepared, the polymerization was carried out as described in Example 1.

The results are shown in Table 1.

TABLE 1

| Example | Contact time (min.) | Activity of catalyst (g/g of cat.) |
|---|---|---|
| 2 | 30 | 8.4 |
| 3 | 180 | 11.9 |
| 4 | 360 | 8.1 |

EXAMPLE 5

Preparation of Catalyst

A cylinder of a stainless steel ball mill having an inner volume of 800 ml and an inner diameter of 100 mm and containing 2.8 kg of stainless steel balls of a diameter of 15 mm, was charged with 10.0 grams of commercially available zinc oxide and 16.2 grams of glutaric acid and milling was carried out with a shock acceleration of 7G for a period of 15 minutes. The solid product so treated was dried at a temperature of 150° C. under a reduced pressure and dispersed in hexane to provide a slurry of the catalyst in hexane.

Polymerization

Using 5 grams of the catalyst so prepared, the polymerization was carried out as described in Example 1. The polymer obtained weighed 34.3 grams after drying. The yield of the polymer was 6.9 g per gram of the catalyst.

EXAMPLES 6 AND 7

Catalysts were prepared as described in Example 5 except that the zinc oxide was brought in contact with the glutaric acid for various periods of time as indicated in Table 2. Using each of the catalysts so prepared, the polymerization was carried out as described in Example 1.

The results are shown in Table 2.

TABLE 2

| Example | Contact time (min.) | Activity of catalyst (g/g of cat.) |
|---|---|---|
| 6 | 30 | 8.3 |
| 7 | 60 | 6.5 |

COMPARATIVE EXAMPLE 1

Preparation of Catalyst

A solution of 12 grams of glutaric acid in 150 ml of methanol was dropwise added to a solution of 20 grams of a commercially available zinc acetate in 200 ml of methanol over a period of 30 minutes under stirring at ambient temperature. Stirring was further continued for 2 hours at ambient temperature. The white precipitate so formed was recovered by filtration, washed with methanol, dried at a temperature of 150° C. under a reduced pressure and used for the polymerization in the form of a slurry in hexane.

Polymerization

Using 5 grams of the catalyst so prepared the polymerization was carried out as described in Example 1. The polymer obtained weighed 5.1 grams after drying. The yield of the polymer was 1 g per gram of the catalyst.

COMPARATIVE EXAMPLE 2

Comparative Example 1 was repeated except that the catalyst was prepared by dropwise addition of the solution of zinc acetate in methanol to the solution of glutaric acid in methanol. The yield of the polymer was 1.7 g per gram of the catalyst.

EXAMPLE 8

Preparation of Catalyst 10.0 grams of commercially available zinc oxide, 16.2 grams of glutaric acid and 20 ml of n-decane were charged into a cylinder of a stainless steel having an internal volume of 800 ml and an inner diameter of 100 mm and containing 2.8 kg of stainless steel balls having a diameter of 15 mm and the mixture was pulverized with a shock acceleration of 7G for 30 minutes. The solid product so treated was dried by heating under reduced pressure to prepare a zinc-containing solid catalyst of the invention.

Polymerization

Into a 2 liter autoclave was charged a slurry consisting of 700 ml of hexane and 4.6 grams of the zinc-containing solid catalyst, 200 ml of propylene oxide and carbon dioxide and the system was maintained at 80° C. and 20 kg/cm$^2$ G. The polymerization was carried out for 2 hours while supplying amounts of carbon dioxide consumed. After completion of the polymerization, the autoclave was cooled and depressurized. From the hexane slurry of a polymer which was white due to the presence of the catalyst, the polymer was recovered by filtration. The yield of the polymer was 44.9 grams and the activity of the catalyst was 9.8 g/g-cat.

EXAMPLES 9 TO 12

Catalysts were prepared in a similar manner as in Example 8 but replacing n-decane used therein by ethyl acetate, toluene, dioxane, and isobutanol, respectively as shown in Table 3. Using each of the catalysts thus prepared, the polymerization was carried out similarly to the method of Example 8.

The results are shown in Table 3.

TABLE 3

| Example | Organic solvent | Yield (g) | Activity of catalyst (g/g of cat) |
|---|---|---|---|
| 8 | n-decane | 44.9 | 9.8 |
| 9 | ethyl acetate | 62.6 | 13.6 |
| 10 | toluene | 61.2 | 13.3 |
| 11 | dioxane | 79.6 | 17.3 |
| 12 | isobutanol | 74.5 | 16.2 |

EXAMPLES 13 TO 17

Catalysts were prepared in a similar manner as in Example 8 but using various times of the pulverization as indicated in Table 4. Using each of the catalysts thus prepared, the polymerization was carried out similarly to the method of Example 8.

The results are shown in Table 4.

TABLE 4

| Example | Pulverization time (min.) | Yield (g) | Activity of catalyst (g/g of cat) |
|---|---|---|---|
| 13 | 5 | 48.3 | 10.5 |
| 14 | 15 | 53.4 | 11.6 |
| 15 | 60 | 60.7 | 13.2 |
| 16 | 180 | 60.3 | 13.1 |
| 17 | 360 | 57.0 | 12.4 |

EXAMPLES 18 TO 22

Catalysts were prepared in a similar manner as in Example 11 but using various times of the pulverization as indicated in Table 5. Using each of the catalysts thus prepared, the polymerization was carried out similarly to the method of Example 8.

The results are shown in Table 5.

TABLE 5

| Example | Pulverization time (min.) | Yield (g) | Activity of catalyst (g/g of cat) |
|---------|---------------------------|-----------|-----------------------------------|
| 18 | 15 | 68.5 | 14.9 |
| 19 | 60 | 115.0 | 25.0 |
| 20 | 180 | 121.9 | 26.5 |
| 21 | 360 | 157.3 | 34.2 |
| 22 | 720 | 131.1 | 28.5 |

EXAMPLES 23 TO 26

Catalysts were prepared in a similar manner as in Example 10 but using various molar ratios of zinc oxide(ZnO) to glutaric acid(GA) as indicated in Table 6. Using each of the catalysts thus prepared, the polymerization was carried out similarly to the method of Example 8.

The results are shown in Table 6.

TABLE 6

| Example | Molar ratio ZnO/GA | Yield (g) | Activity of catalyst (g/g of cat) |
|---------|--------------------|-----------|-----------------------------------|
| 23 | 1/0.95 | 47.8 | 10.4 |
| 24 | 1/0.9 | 55.2 | 12.0 |
| 25 | 1/0.8 | 47.4 | 10.3 |
| 26 | 1/0.6 | 38.6 | 8.4 |

COMPARATIVE EXAMPLE 3

Preparation of Catalyst

Catalysts were prepared in a similar manner as in Example 8 but using water (pulverizing assistant) as indicated in Table 7. Using the catalysts thus prepared, the polymerization was carried out similarly to the method of Example 8.

The results are shown in Table 7.

TABLE 7

| Comparative Example | Pulverizing Assistant | Yield (g) | Activity of catalyst (g/g of cat) |
|---------------------|------------------------|-----------|-----------------------------------|
| 3 | water (20 ml) | 33.6 | 7.3 |

What is claimed is:

1. A process for preparing a polyalkylene carbonate comprising copolymerizing carbon dioxide with an epoxide using a zinc-containing solid catalyst prepared by contacting zinc oxide with an organic dicarboxylic acid under a mechanical pulverization treatment.

2. A process for preparing a polyalkylene carbonate comprising copolymerizing carbon dioxide with an epoxide using a zinc-containing solid catalyst prepared by contacting zinc oxide with an organic dicarboxylic acid in a presence of an organic solvent under a mechanical pulverization treatment.

3. The process as claimed in claim 2 wherein the organic solvent is aliphatic hydrocarbons, aromatic hydrocarbons, phenols, ethers, alcohols, esters, nitriles or amines.

4. The process as claimed in claim 1 or 2 wherein the epoxide is propylene oxide, ethylene oxide or cyclohexene oxide.

5. The process as claimed in claim 1 or 2 wherein a pressure of carbon dioxide is from 0 to 200 kg/cm$^2$ G.

6. The process as claimed in claim 1 or 2 wherein a polymerization temperature is from 0° to 200° C.

* * * * *